Patented July 22, 1947

2,424,341

UNITED STATES PATENT OFFICE 2,424,341

TETRABUTYRYL RIBONIC ACID

Max Tishler, Rahway, N. J., assignor to Merck & Co., Inc., Rahway, N. J., a corporation of New Jersey No Drawing. Application July 26, 1945,
Serial No. 607,262

1 Claim. (Cl. 260—488)

This invention relates to new chemical compounds and to processes for preparing the same, and is a continuation-in-part of co-pending application Serial No. 394,505, filed May 21, 1941, which in turn is a continuation in part of the then copending application Serial No. 325,182, filed March 21, 1940, now Patent 2,261,608, issued November 4, 1941.

The present invention relates to the synthesis of certain novel acylated ribonyl compounds that are useful as intermediates in the synthesis of the vitamin riboflavin. These novel compounds according to this invention are represented by the general formula:

wherein R is an acyl group. In accordance with this invention, these novel compounds are prepared by reactions represented as follows, R again representing an acyl group:

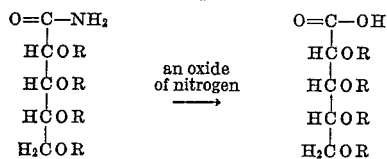

It is now discovered, according to the present invention, that tetraacyl ribonamide may be obtained by acylating ribonamide; tetraacyl ribonic acid may be obtained by treating tetraacyl ribonamide with an oxide of nitrogen; and that a tetraacyl ribonyl halide may be obtained by treating a tetraacyl ribonic acid, or salt thereof, with a halide or oxyhalide of phosphorus or sulfur.

The tetraacyl ribonyl halide may be reduced to tetraacyl ribose which may then be used in the synthesis of riboflavin.

The following examples illustrate methods of carrying out the present invention, but it is to be understood that these examples are given by way of illustration and not of limitation.

Example 1

Ten grams of tetraacetyl d-ribonamide in 40 cc. of glacial acetic acid are treated with nitrous anhydride at 8–10° C. until the evolution of nitrogen ceases. After the reaction mixture has stood overnight in the refrigerator (0–5° C.), it is added to a mixture of 175 cc. of water and 75 g. of sodium bicarbonate. The alkaline solution is made acid to Congo by the addition of dilute HCl (1–1), and warmed on the steam bath to 40° C. The acidic solution is cooled and extracted with chloroform. The chloroform extract is dried over anhydrous sodium sulfate, and evaporated under reduced pressure. Yield of tetraacetyl ribonic acid=9.45 g. (94.5% of theory); M. P. 131–3° C. Upon recrystallization from dry toluene, it melts at 136–8° C.

The product may also be isolated after treatment with nitrous anhydride by concentrating the acetic acid solution under dryness to a syrup. The syrup is then taken up in a little ether, and allowed to crystallize. About 88% yield is obtained by this procedure.

Example 2

About 200 cc. of U. S. P. sulfuric acid is added slowly by means of a dropping funnel to about 100 g. of solid sodium nitrate contained in a closed vessel equipped with gas inlet and outlet tubes. A slow, continuous stream of oxygen is passed into the above vessel and the nitrogen dioxide evolved is led by means of the gas outlet tube to a short water-cooled condenser and thence through a calcium chloride drying tube and is then passed directly into a solution of about 100 g. of tetraacetyl ribonamide in 210 cc. of glacial acetic acid and 40 cc. of acetic anhydride. The solution is stirred continuously and the temperature maintained between 25 and 30° C. throughout. The flow of nitrogen dioxide is so regulated, by the addition of sulfuric acid to the sodium nitrate, that the rate of absorption of nitrogen dioxide by the reaction mixture equals its rate of addition thereto. By this procedure the oxidation is completed in three hours. The reaction mixture is stirred one hour longer and the tetraacetyl ribonic acid is filtered and washed with cold benzene. Yield=77% of theory. (M. P. 138–140°.) Concentration of the filtrate yields an additional 7.8% tetraacetyl ribonic acid. (M. P. 134–137° C.)

Example 3

About ten grams of tetrapropionyl d-ribonamide in 20 cc. of propionic acid and 4 cc. of propionic anhydride are treated with nitrous anhydride at a rate such that the nitrous anhydride is absorbed. (Approximately 3 hours are required.) During the addition, the solution is stirred and maintained at approximately 25–30° C. After all the nitrous anhydride has been added, the solution is stirred for one hour longer whereupon the evolution of nitrogen ceases. The solution is then heated to about 65° C. for a period of about 6 hours and concentrated in vacuo below 60° C. The tetrapropionyl ribonic acid which is obtained, is filtered, washed with cold benzene, and recrystallized from a 1-1 mixture of ether and petroleum ether. (M. P. 70.5-71.0° C.)

*Example 4*

About ten grams of tetrabutyryl d-ribonamide in 20 cc. of butyric acid and 4 cc. of butyric anhydride are treated with nitrous anhydride at a rate such that the nitrous anhydride is absorbed (approximately 3 hours are required). During the addition, the solution is stirred and maintained at approximately 25-30° C. After all the nitrous anhydride has been added, the solution is stirred for one hour longer whereupon the evolution of nitrogen ceases. The solution is then heated to about 65° C. for a period of about 6 hours and concentrated in vacuo at 60° C. The tetrabutyryl d-ribonic acid which is obtained is filtered, washed with cold benzene and recrystallized from a 1-1 mixture of ether and petroleum ether. (M. P. 40.0-40.5° C.)

Other acyl ribonic acids can be obtained by employing as starting materials different acyl ribonamides, as for example, tetrabenzoyl ribonamide, tetraphenylacetyl ribonamide, and the like, which are then reacted with an oxide of nitrogen as above described.

Among the oxides of nitrogen which may be employed in the presently invented process are nitrous anhydride, nitric anhydride, nitrogen dioxide, nitrogen tetroxide, and the like. Alternatively, a mixture of air and nitric oxide may be employed, whereby the nitric oxide is oxidized to the dioxide.

Modifications may be made in carrying out the present invention without departing from the spirit and scope thereof and the invention is to be limited only by the appended claim.

What is claimed is:

Tetrabutyryl ribonic acid.

MAX TISHLER.

REFERENCES CITED

The following references are of record in the file of this patent:

UNITED STATES PATENTS

| Number | Name | Date |
|---|---|---|
| 2,237,263 | Pasternack et al. | Apr. 1, 1941 |